Aug. 9, 1927.

F. C. VANDERGRIFT 1,638,224

ROTARY PIPE JOINT

Filed Oct. 23, 1924

Inventor
Frank C. Vandergrift
By Stull, Brock & West
Attys.

Patented Aug. 9, 1927.

1,638,224

UNITED STATES PATENT OFFICE.

FRANK C. VANDERGRIFT, OF AKRON, OHIO, ASSIGNOR TO THE WILLIAMS FOUNDRY & MACHINE COMPANY, OF AKRON, OHIO, A CORPORATION OF OHIO.

ROTARY PIPE JOINT.

Application filed October 23, 1924. Serial No. 745,314.

This invention relates to an improved rotary or so-called "swing" joint for pipes, and it has for its objects to provide a joint of this character that is thoroughly leak proof yet easy of operation; that is convenient and economical of re-packing, the latter resulting from the fact that a standard form of packing material is employed; and to provide in a joint of the aforesaid nature two packing rings or washers that are simultaneously and uniformly compressed by a single adjustment.

Figure 1:
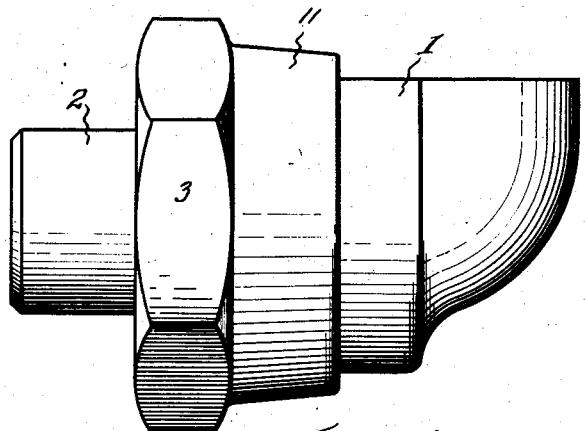
Figure 2:
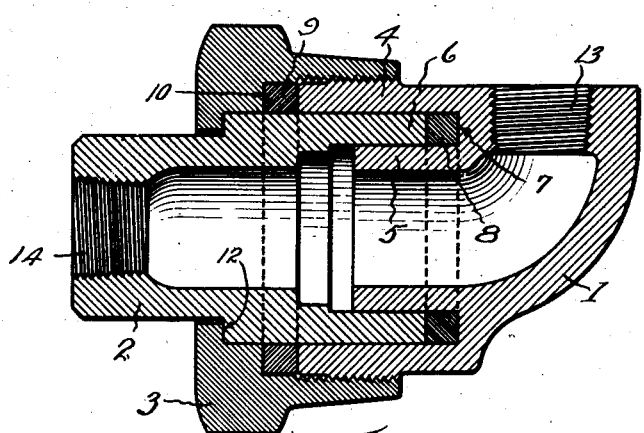

These objects, with others hereinafter appearing, are attained in the embodiment of the invention illustrated in the accompanying drawing wherein Fig. 1 is an elevational view of my improved rotary joint, and Fig. 2 is a central longitudinal section through the same.

The joint comprises a receiving member 1, an entering member 2, and a clamping nut 3 for binding the members together and compressing the packing rings or washers as will hereinafter be more fully described.

The receiving member terminates at its receiving end in radially spaced apart and concentrically related cylindrical outer and inner flanges 4 and 5 which receive between them the cylindrical end 6 of the entering member 2.

Within the channel enclosed by the flanges 4 and 5, and between the bottom wall 7 thereof and the opposed end of the entering member, is adapted to be compressed a washer 8 of suitable packing material. A similar washer 9 is confined by the nut 3 about the cylindrical end 6 of the entering member and is adapted to be compressed between a shoulder 10 of the nut and the end of the flange 4 of the receiving member when the internally threaded extension 11 of the nut is screwed along the threaded portion of the flange 4. A like pressure to that exerted upon the washer 9 is imposed upon the washer 8 by reason of the bearing of the reduced end of the nut upon an abutment 12 of the entering member. Thus both packing washers are simultaneously and uniformly compressed by a single adjustment of the nut 3.

It will be observed, also, that in cross section the two packing washers are identical. They are preferably formed from a standard packing material obtainable on the market in convenient lengths and readily cut into such lengths as are required for the washers 8 and 9. This insures users of the joint against difficulty in procuring replacement washers, and makes it possible to repack the joint at slight expense. The ease with which the joint may be re-packed is evident from the construction.

The members 1 and 2 are threaded at 13 and 14, respectively, for connection with pipe sections, and the former member is shown as an angle or elbow, although obviously it may be made straight or of any other desired form.

Having thus described my invention, what I claim is:—

A rotary pipe joint comprising a receiving member which terminates at its receiving end in radially spaced apart and concentrically related cylindrical outer and inner imperforate flanges the former being externally threaded, an entering member having a cylindrical end fitting between the inner and outer flanges of the receiving member and being reduced in diameter outwardly of said cylindrical end thereby to provide an external annular abutment portion facing the same direction as the end of the receiving member, a clamping nut surrounding the interengaging ends of said members, the nut being internally threaded at one end for cooperation with the aforesaid threads of the receiving member and being reduced at the other end for cooperation with the shoulder of the entering member and serving as the sole means of securing said members together, the nut having a shoulder opposed to the end of the outer flange of the receiving member, and packing washers, one occupying the channel between the inner and outer flanges of the receiving member and adapted to be compressed between the bottom wall thereof and the end of the entering member, and the other surrounding the entering member and adapted to be compressed between the end of the outer flange of the receiving member and the aforesaid shoulder of the nut.

In testimony whereof, I hereunto affix my signature.

FRANK C. VANDERGRIFT.